No. 632,397. Patented Sept. 5, 1899.
B. E. CHOLLAR.
GAS PURIFIER.
(Application filed Aug. 5, 1898.)
(No Model.) 2 Sheets—Sheet 1.
Fig. I.
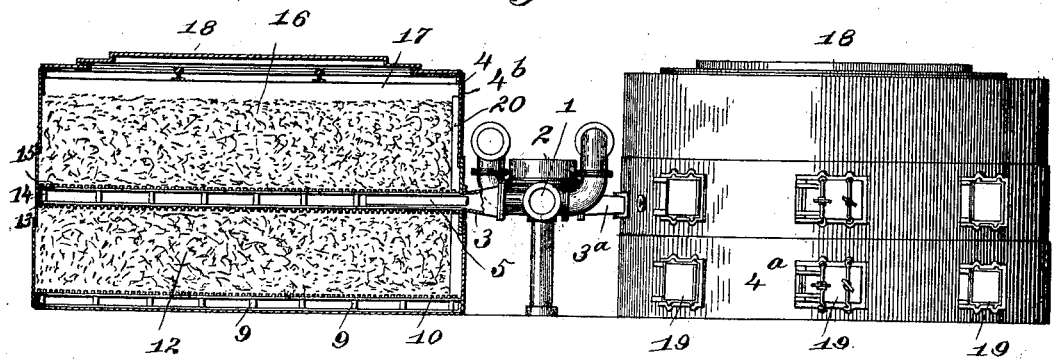
Fig. II.
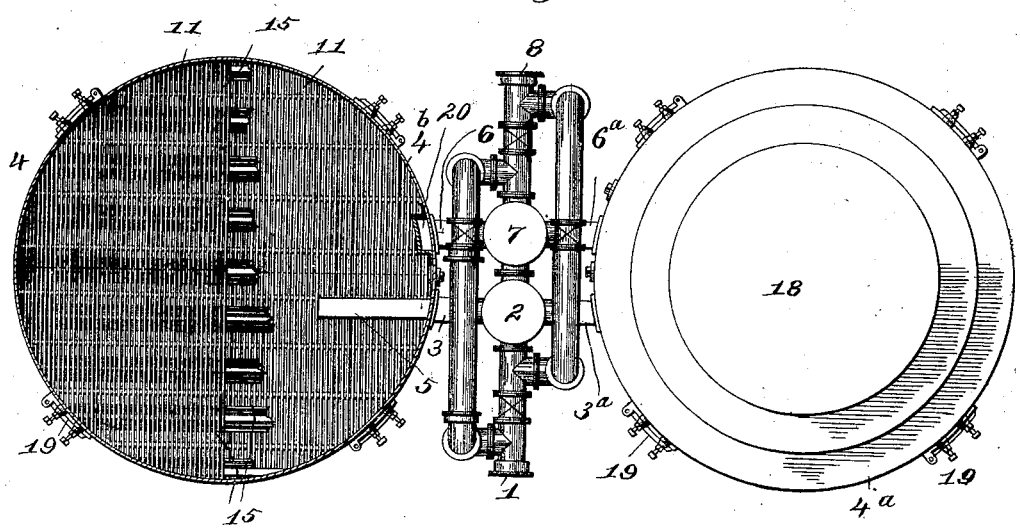
Witnesses
Inventor
Byron E. Chollar
By Wright Bro
Attorneys No. 632,397. Patented Sept. 5, 1899.
B. E. CHOLLAR.
GAS PURIFIER.
(Application filed Aug. 5, 1898.)
(No Model.) 2 Sheets—Sheet 2.
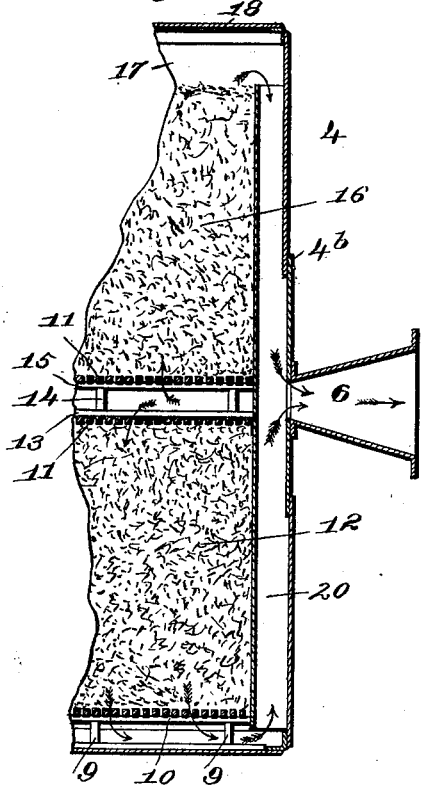
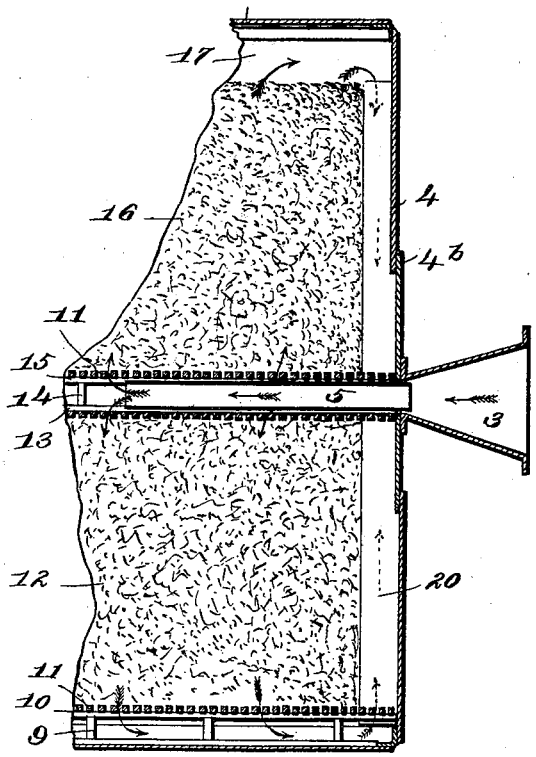
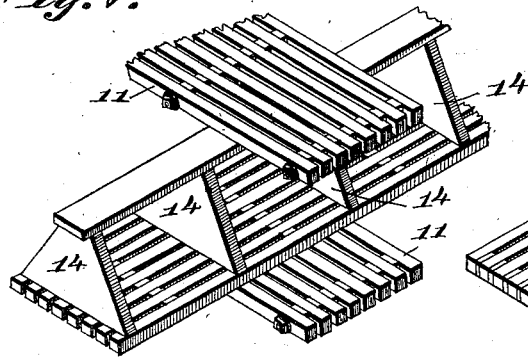
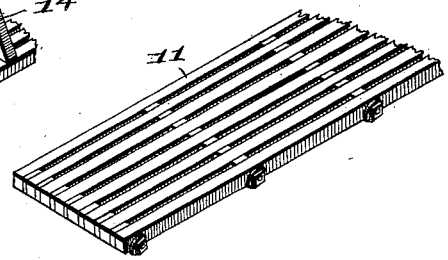
Witnesses
Inventor
Byron E. Chollar
By Knight Bros
Attorneys

UNITED STATES PATENT OFFICE.

BYRON E. CHOLLAR, OF ST. LOUIS, MISSOURI.

GAS-PURIFIER.

SPECIFICATION forming part of Letters Patent No. 632,397, dated September 5, 1899.

Application filed August 5, 1898. Serial No. 687,773. (No model.)

*To all whom it may concern:*

Be it known that I, BYRON E. CHOLLAR, a citizen of the United States, residing at the city of St. Louis, in the State of Missouri, have invented certain new and useful Improvements in Gas-Purifiers, of which the following is a full, clear, and exact description, reference being had to the accompanying drawings, forming part of this specification.

Coal-gas on leaving the scrubber contains a large amount of carbonic acid, sulfureted hydrogen, and other sulfur compounds. It is necessary that these impurities be removed, and for this purpose the gas is passed through a purifier.

It is the object of my invention to provide an improved tank, in which the purifying material is placed, and a new manner of placing this material, which distributes the gas equally therethrough. The device for this purpose is illustrated in the accompanying drawings, forming a part of this specification, in which—

Figure I illustrates two tanks, one shown in side elevation and the other in vertical section. Fig. II represents a top view of the said tanks, one thereof being in horizontal section, showing the grids partly broken away. Fig. III is a detail vertical section of one side of one of the tanks, showing the gas-exit. Fig. IV is a similar detail section showing the gas-entrance. Fig. V is a detail perspective view showing the manner in which the grids are placed. Fig. VI is a perspective view of one of the grids.

In the drawings I have shown duplicate tanks, which are counterparts of each other and either of which forms a complete purifier in itself. I prefer to use the purifying-tanks in duplicate, inasmuch as by such an arrangement I am enabled to pass the gas through either one of the purifying-tanks only, or I may pass it through both tanks by conveying it first to one and then to the other. Where the gas is passed through but one tank at a time, it is a matter of great convenience to have the other tank connected to the same piping, for the unused tank can be readily thrown out of communication with the passage-way, through which the gas is passed, and old purifying material removed and new material applied in its place. I have shown a system of piping connecting the duplicate tanks, through which the gas may be conveyed to either of the tanks without passing to the other or through which the gas may pass to both tanks in sequence. The gas may pass through such piping in either direction; but it will be sufficient for the purpose of describing my present invention to set forth in detail the course taken by the gas in flowing in one general direction.

1 designates an entry-pipe connected with a source of gas-supply. From the pipe 1 the gas flows into a valve 2 and from said valve may flow to either tank 4 or $4^a$ through inlets 3 or $3^a$ or flow to both tanks in sequence.

5 designates a tube seated at one end at the tank-inlets 3 or $3^a$ and having its other end extending into the purifying-tank to a considerable distance. The length of the pipe 5 and the consequent distance that it extends into the purifying-tank is determined by the distance that it may be desired to conduct the gas into the tank before its discharge into the area thereof.

6 $6^a$ designate outlet-pipes which communicate with the interiors of the tanks 4 $4^a$. At the intersection of these pipes 6 $6^a$ is a valve 7.

8 designates a conveying-pipe through which the purified gas may be conducted to the gas-holder.

While I have described the gas as entering through the pipe 1 and discharging through the pipe 8, it is evident that it may enter and discharge in the reversed direction and also that its flow to either one tank or the other, or both the tanks in sequence, may be controlled by means of suitable valves placed throughout the piping. Within each tank, at the bottom thereof, are a series of sills or supports 9, on which gridwork 10 is mounted. On top of the gridwork 10 I place a layer 12 of purifying material of sufficient depth to extend, preferably, to a point immediately beneath the inlet and outlet of the tank. The purifying material I prefer to employ is ferric oxid mixed with sawdust or other material of porous nature. On top of the layer 12 of purifying material I place a second gridwork 13. This gridwork, as well as the others used, is made up of the grids 11. (Shown in detail in Figs. V and VI.) On top of the gridwork 13 I place a series of separated supports 14, arranged on edge and extending across the interior of the tank. The supports 14 I prefer to construct, as shown, somewhat wider at the bottom than at the top to insure stability. On these rest another layer 15 of grids 11, and above them is then placed a second layer 16 of the purifying material, but leaving a space 17 between its top and the cover 18 of the tank. The supports 14 separate the layers of gridwork 13 and 15 and provide a space between such layers in which the gas is free to circulate and distribute itself so as to pass in equal distribution into the layers 12 and 16 of purifying material.

19 are manholes in the sides of the tank 4 for the purpose of affording access to the interior thereof when necessary for emptying and filling the tank.

The gas is introduced through the pipes 1 3 to the tube 5, which lies between the gridwork 13 and 15, and whose inner end extends, as shown, some considerable distance from the side wall 4$^b$, while the outer end fits snugly to the inlet 3. This pipe 5 may be of any desired length suitable to convey the gas therethrough a required distance into the purifier. It discharges the gas up and down from the flat space into which it is introduced through the gridwork and purifying material 12 and 16. At both the top and bottom spaces after the gas has filtered through this said purifying material it collects and is forced by pressure through the passages 20, which are secured to the inside of the tank-walls and which have their exit into the outlet-pipe 6, and thence the gas is conducted as required.

The grids 11 are preferably constructed of parallel wooden strips bolted together and interposed at different points. I have shown a circular tank in which it is necessary to have the grids next the periphery curved to conform to the circle. In a rectangular tank irregularity in the form of grids would not occur and any taken at random could be placed immediately.

Gas-purifiers as heretofore constructed have had the gridwork supported upon ledges extending around the interior of the tank-walls and posts or uprights arranged throughout the tank to provide supports for the gridwork intermediate of the walls, there being tiers of gridwork with the purifying material laid on each set of gridwork. In such construction the layers of purifying material are entirely separated from each other and the weight of no layer is borne by another of the set. In other words, the layers of material are arranged independent of each other and supported by its individual supports at the sides of the tank or bearing upon the bottom of the tank. In a purifier constructed in accordance with my invention I avoid the necessity of using supports for the gridwork, and therefore greatly simplify and lessen the expense of the purifier construction.

The supports 14 lying between the gridwork 13 and 15 separate the two sets of gridwork and allow free space for the circulation of gas between them, so that the gas may flow in all directions between the gridwork to reach all of the facing surfaces of the beds of purifying material.

I claim as my invention—

1. In a gas-purifier, the combination of a tank, a lower gridwork within said tank supported on the bottom thereof, a lower layer of purifying material on said lower gridwork, a double gridwork on said lower layer of purifying material having a gas passage-way extending laterally therethrough, and a superimposed layer of purifying material on said double gridwork wholly supported by the lower layer of purifying material, said tank being provided with an inlet and an outlet, said inlet or outlet being located at said double gridwork to discharge into or receive discharge from the passage-way in the gridwork substantially as described.

2. In a gas-purifier, the combination of a tank having a lower layer of purifying material laid in the bottom thereof, gridwork mounted on said purifying material, an upper layer of purifying material laid on said gridwork and supported wholly by said lower layer of purifying material; said gridwork being composed of two layers, and supports arranged between said layers of gridwork for the purpose of forming a gas-distributing space between them, substantially as set forth.

3. In a gas-purifier, the combination of a tank, a lower gridwork within said tank supported on the bottom thereof, a lower layer of purifying material on said lower gridwork, a double gridwork on said lower layer of purifying material having a gas passage-way extending laterally therethrough, and a superimposed layer of purifying material on said double gridwork wholly supported by the lower layer of purifying material, said tank being provided with an inlet and an outlet, said inlet being located at said double gridwork to discharge into the passage-way therein, and a tube extending from said inlet into said passage-way for the purpose of discharging the flow of gas at a point remote from the inlet; substantially as described.

BYRON E. CHOLLAR.

In presence of—
  E. S. KNIGHT,
  G. A. TAUBERSCHMIDT.